US011795302B2

(12) United States Patent
Sasaki et al.

(10) Patent No.: US 11,795,302 B2
(45) Date of Patent: *Oct. 24, 2023

(54) RESIN PARTICLES AND METHOD FOR MANUFACTURING RESIN PARTICLES

(71) Applicant: FUJIFILM BUSINESS INNOVATION CORP., Tokyo (JP)

(72) Inventors: Koji Sasaki, Kanagawa (JP); Takahiro Mizuguchi, Kanagawa (JP); Yuka Zenitani, Kanagawa (JP); Sakae Takeuchi, Kanagawa (JP); Yoshifumi Eri, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 145 days.

This patent is subject to a terminal disclaimer.

(21) Appl. No.: 17/157,208

(22) Filed: Jan. 25, 2021

(65) Prior Publication Data

US 2022/0017723 A1  Jan. 20, 2022

(30) Foreign Application Priority Data

Jul. 15, 2020  (JP) .................. 2020-121632

(51) Int. Cl.
| | | |
|---|---|---|
| C08K 9/02 | (2006.01) | |
| C08K 9/06 | (2006.01) | |
| C08K 3/36 | (2006.01) | |
| C08K 5/5445 | (2006.01) | |
| C08K 5/19 | (2006.01) | |
| C08G 63/20 | (2006.01) | |
| C08K 3/08 | (2006.01) | |

(52) U.S. Cl.
CPC ............... *C08K 9/02* (2013.01); *C08G 63/20* (2013.01); *C08K 3/08* (2013.01); *C08K 3/36* (2013.01); *C08K 5/19* (2013.01); *C08K 5/5445* (2021.01); *C08K 9/06* (2013.01); *C08K 2003/0812* (2013.01)

(58) Field of Classification Search
CPC ... C08K 9/02; C08K 3/08; C08K 3/36; C08K 5/19; C08K 5/5445; C08K 9/04; C08K 2003/0812; C08K 2201/013; C08G 63/20; C08J 3/12; C08J 2367/06; C08J 3/203
USPC ....................................................... 523/204
See application file for complete search history.

(56) References Cited

U.S. PATENT DOCUMENTS

| | | | |
|---|---|---|---|
| 11,169,459 B2* | 11/2021 | Tanaka ................ | G03G 9/0928 |
| 2014/0106269 A1* | 4/2014 | Tanaka ............... | G03G 5/14708 |
| | | | 428/402 |
| 2020/0348611 A1 | 11/2020 | Yokota et al. | |
| 2021/0253750 A1* | 8/2021 | Kembo ................ | C08G 63/672 |
| 2021/0300771 A1* | 9/2021 | Zenitani .............. | C09C 1/3045 |
| 2022/0306842 A1* | 9/2022 | Oki .......................... | C08L 1/12 |
| 2022/0373912 A1* | 11/2022 | Tomita ................. | G03G 9/0825 |

FOREIGN PATENT DOCUMENTS

| | | |
|---|---|---|
| JP | 2009-114338 A | 5/2009 |
| JP | 2017-39618 A | 2/2017 |
| JP | 2018-9054 A | 1/2018 |
| JP | 2019-73418 A | 5/2019 |

OTHER PUBLICATIONS

English Machine Translation of JP 2004-143028 (Year: 2004).*

* cited by examiner

*Primary Examiner* — Hannah J Pak
(74) *Attorney, Agent, or Firm* — Oliff PLC

(57) ABSTRACT

Resin particles include resin base particles and silica particles on surfaces of the resin base particles. The silica particles contain a quaternary ammonium salt and have hydrophobized surfaces. A difference (detection temperature A−detection temperature B) between a detection temperature A and a detection temperature B is more than 50° C., where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning.

19 Claims, No Drawings

RESIN PARTICLES AND METHOD FOR MANUFACTURING RESIN PARTICLES

CROSS-REFERENCE TO RELATED APPLICATIONS

This application is based on and claims priority under 35 USC 119 from Japanese Patent Application No. 2020-121632 filed Jul. 15, 2020.

BACKGROUND

(i) Technical Field

The present disclosure relates to resin particles and a method for manufacturing the resin particles.

(ii) Related Art

Japanese Unexamined Patent Application Publication No. 2017-39618 discloses "a silica powder containing silica particles with a silica structure having a Si—O bond as a repeating unit, wherein the silica structure is modified with a quaternary ammonium salt".

Japanese Unexamined Patent Application Publication No. 2019-73418 discloses "a hydrophobic silica powder wherein (1) the hydrophobic silica powder has a hydrophobicity of 50% or more, (2) the amount X of at least one compound selected from the group consisting of a quaternary ammonium ion, a monoazo complex, and a mineral acid ion extracted with a mixed solvent of methanol and a methanesulfonic acid aqueous solution is 0.1 mass % or more, and (3) the amount X and the amount Y of the above compound extracted with water satisfy the relationship of Y/X<0.15.

Japanese Unexamined Patent Application Publication No. 2009-114338 discloses "a rubber composition containing a diene rubber as a rubber component, and surface-treated zeolite fine particles.

SUMMARY

Aspects of non-limiting embodiments of the present disclosure relate to resin particles including resin base particles and silica particles on the surfaces of the resin base particles and a method for manufacturing the resin particles. The silica particles contain a quaternary ammonium salt and have hydrophobized surfaces. The resin particles have a smaller charge amount and show better dispersibility in a hydrophobic material than resin particles satisfying the following: a difference (detection temperature A−detection temperature B) between a detection temperature A and a detection temperature B is 50° C. or less, where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning; the ratio ($F_{BEFORE}/F_{AFTER}$) between the maximum frequencies of pore diameters of 2 nm or less in the silica particles is less than 0.9 or more than 1.1; or the ratio ($F_{SINTERING}/F_{BEFORE}$) between the maximum frequencies of pore diameters of 2 nm or less in the silica particles is less than 5 or more than 20.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there are provided resin particles comprising resin base particles and silica particles on surfaces of the resin base particles, the silica particles containing a quaternary ammonium salt and having hydrophobized surfaces, wherein a difference (detection temperature A−detection temperature B) between a detection temperature A and a detection temperature B is more than 50° C., where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning.

DETAILED DESCRIPTION

Exemplary embodiments of the present disclosure will be described below. The following description and Examples are provided to illustrate exemplary embodiments but are not intended to limit the scope of the exemplary embodiments.

The upper limit or the lower limit of one numerical range in stepwise numerical ranges in this specification may be replaced by the upper limit or the lower limit of another stepwise numerical range. The upper limit or lower limit of any numerical range described in the present disclosure may be replaced by the values described in Examples.

In this specification, each component may contain multiple corresponding substances.

In this specification, the amount of each component in a composition refers to, when there are multiple substances corresponding to each component in the composition, the total amount of the substances present in the composition, unless otherwise specified.

In this specification, the term "step" not only includes an independent step but also includes a step that cannot be clearly distinguished from other steps but accomplishes the intended purpose.

Resin Particles

The resin particles according to a first exemplary embodiment contain resin base particles and silica particles on the surfaces of the resin base particles.

The silica particles contained in the resin particles according to the first exemplary embodiment contain a quaternary ammonium salt and have hydrophobized surfaces.

With regard to the resin particles according to the first exemplary embodiment, a difference (detection temperature A−detection temperature B) between a detection temperature A and a detection temperature B is more than 50° C., where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning.

The resin particles according to a second exemplary embodiment contain resin base particles and silica particles on the surfaces of the resin base particles.

The silica particles contained in the resin particles according to the second exemplary embodiment contain a quaternary ammonium salt and have hydrophobized surfaces.

With regard to the silica particles contained in the resin particles according to the second exemplary embodiment, the ratio ($F_{BEFORE}/F_{AFTER}$) between the maximum frequencies of pore diameters of 2 nm or less in the silica particles is 0.9 or more and 1.1 or less, and the ratio ($F_{SINTERING}/F_{BEFORE}$) between the maximum frequencies of pore diameters of 2 nm or less in the silica particles is 5 or more and 20 or less.

$F_{BEFORE}$: the maximum frequency of pore diameters of 2 nm or less in the silica particles before cleaning determined from a pore diameter distribution curve in nitrogen gas adsorption analysis.

$F_{AFTER}$: the maximum frequency of pore diameters of 2 nm or less in the silica particles after cleaning determined from a pore diameter distribution curve in nitrogen gas adsorption analysis.

$F_{SINTERING}$: the maximum frequency of pore diameters of 2 nm or less in the silica particles before cleaning and after sintering at 700° C. determined from a pore diameter distribution curve in nitrogen gas adsorption analysis.

Hereinafter, the resin particles according to the first exemplary embodiment and the resin particles according to the second exemplary embodiment are also collectively referred to as the resin particles according to the exemplary embodiments.

The silica particles are added to a hydrophobic material in various applications, such as fillers and thixotropy-imparting agents. However, existing silica particles tend to have a large charge amount on the particle surfaces. In a mixture containing silica particles and a hydrophobic material, the silica particles may be charged to cause charging of the mixture.

Furthermore, the silica particles may tend to aggregate in the mixture. The mixture may thus tend to be locally largely charged in areas where the silica particles aggregate. The mixture may thus tend to accumulate static electricity in areas where the silica particles are unevenly distributed.

Since the resin particles according to the exemplary embodiments have the above features, they have a small charge amount and show good dispersibility in a hydrophobic material.

To form a mixture by, for example, addition of the resin particles according to the exemplary embodiments to a hydrophobic material, the silica particles can be added to the hydrophobic material with aggregation of the silica particles suppressed.

The reason for this is not fully clear but is assumed as described below.

The silica particles contained in the resin particles according to the exemplary embodiments contain a quaternary ammonium salt. The quaternary ammonium salt has a positive charge. The silica particles containing the quaternary ammonium salt have, on their surfaces, a charge opposite to the charge of the silica surface and are thus unlikely to be triboelectrically charged as the entire bulk as compared to silica particles without a quaternary ammonium salt. The silica particles containing a quaternary ammonium salt thus have a small charge amount. The resin particles having the silica particles containing a quaternary ammonium salt have a small charge amount, accordingly.

With regard to the resin particles according to the first exemplary embodiment, a difference (detection temperature A–detection temperature B) between the detection temperature A and the detection temperature B is more than 50° C., where the detection temperatures A and B are detection temperatures from the pyrolysis product of the quaternary ammonium salt determined by pyrolysis mass spectrometry before and after cleaning, respectively. Since the arrangement of the quaternary ammonium salt in the silica particles differs before and after cleaning of the resin particles, the detection temperature of the quaternary ammonium salt also differs before and after cleaning. A difference (detection temperature A–detection temperature B) between the detection temperature A and the detection temperature B of more than 50° C. means that the quaternary ammonium salt is less likely to be released from the silica particles. This is because the quaternary ammonium salt contained in the silica particles in the resin particles before cleaning is present deep in the pores of the silica particles.

From the foregoing, the resin particles according to the first exemplary embodiment are such that, even when they are added to a hydrophobic material or the like, the quaternary ammonium salt is less likely to be released from the silica particles and the charge amount of the silica particles is kept low. The resin particles having the silica particles have a small charge amount, accordingly.

With regard to the resin particles according to the second exemplary embodiment, the ratio ($F_{BEFORE}/F_{AFTER}$) between the maximum frequencies of pore diameters of 2 nm or less in the silica particles before and after cleaning is 0.9 or more and 1.1 or less, and the ratio ($F_{SINTERING}/F_{BEFORE}$) between the maximum frequencies of pore diameters of 2 nm or less in the silica particles before and after sintering is 5 or more and 20 or less.

First, the ratio ($F_{SINTERING}/F_{BEFORE}$) between the maximum frequencies of pore diameters of 2 nm or less in the silica particles before and after sintering being 5 or more and 20 or less means that the removal of the quaternary ammonium salt in the sintering step tends to expose pores on the silica surface although the pores in the silica particles before sintering are often filled with the quaternary ammonium salt. In other words, the silica particles contained in the resin particles according to the second exemplary embodiment tend to contain the quaternary ammonium salt inside the pores.

The ratio ($F_{BEFORE}/F_{AFTER}$) between the maximum frequencies of pore diameters of 2 nm or less in the silica particles before and after cleaning being 0.9 or more and 1.1 or less means that the amount of the quaternary ammonium salt introduced into the pores in the silica particles is unlikely to change before and after cleaning. In other words, that ratio means that cleaning is unlikely to cause release of the quaternary ammonium salt present inside the pores of the silica particles.

For this reason, the resin particles according to the second exemplary embodiment are such that the quaternary ammonium salt introduced into the pores of the silica particles is less likely to be released from the silica particles. Even when the resin particles according to the second exemplary embodiment are added to a hydrophobic material or the like, the quaternary ammonium salt is thus less likely to be released from the silica particles, and the charge amount of the silica particles is kept low. The resin particles having the silica particles have a small charge amount, accordingly.

The silica particles contained in the resin particles according to the exemplary embodiments have hydrophobized surfaces and tend to be compatible with a hydrophobic material. Since the resin particles according to the exemplary embodiments have hydrophobized silica particles on their surfaces, the resin particles are compatible with a hydrophobic material. Thus, when the resin particles according to the exemplary embodiments are added to a hydrophobic material or the like, the resin particles show high dispersibility in the hydrophobic material.

From the foregoing, the resin particles according to the exemplary embodiments have a small charge amount and good dispersibility in a hydrophobic material because of the above features.

For example, when the resin particles according to the exemplary embodiments are added to a hydrophobic material to form a mixture, the resin particles according to the exemplary embodiments are dispersed well in the hydrophobic material. The silica particles present in the resin particles are thus contained in the hydrophobic material with aggregation of the silica particles suppressed. Since the resin particles according to the exemplary embodiments have a small charge amount, the mixture is unlikely to be charged.

An example of the resin particles according to the exemplary embodiments will be described below in detail. The resin particles according to the exemplary embodiments correspond to the resin particles according to either the first exemplary embodiment or the second exemplary embodiment.

Resin Base Particles

The resin base particles are particles to which the silica particles are to be attached.

The shape, particle diameter, and materials (components) of the resin base particles are not limited as long as the silica particles can be attached to the surfaces of the resin base particles. The shape, particle diameter, and materials (components) are selected according to application of the resin particles according to the exemplary embodiments and the relationship between the resin particles and the silica particles.

The resin base particles contain a resin.

Examples of the resin contained in the resin base particles include thermoplastic resins formed of various natural or synthetic polymers.

The resin contained in the resin base particles is, for example, one of or a mixture of the following resins: polyolefin resins, such as polyethylene and polypropylene; polystyrene resins, such as polystyrene and acrylonitrile/butadiene/styrene copolymer (ABS resin); acrylic resins, such as poly(methyl methacrylate) and poly(butyl acrylate); rubber (co)polymers, such as polybutadiene and polyisoprene; polyester resins, such as polyethylene terephthalate and polybutylene terephthalate; vinyl resins, such as vinyl chloride resin, vinyl aromatic resin, and polyvinyl resin; epoxy resins; conjugated diene resins; polyamide resins; polyacetal resins; polycarbonate resins; polyurethane resins; and fluorocarbon resins.

The resin contained in the resin base particles may be at least one of vinyl resins and polycondensation resins since these resins have little effect on the charge amount of the silica particles and provide resin particles having good dispersibility in a hydrophobic material.

Vinyl resins refer to resins produced by polymerization of a monomer having a vinyl group.

Specific examples of vinyl resins include homopolymers of the following monomers or copolymers of two or more of the following monomers: for example, monomers having a styrene skeleton (e.g., styrene, p-chlorostyrene, α-methylstyrene); monomers having a (meth)acrylic acid ester skeleton (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate); monomers having an ethylenically unsaturated nitrile skeleton (e.g., acrylonitrile, methacrylonitrile); monomers having a vinyl ether skeleton (e.g., vinyl methyl ether, vinyl isobutyl ether); monomers having a vinyl ketone skeleton (e.g., vinyl methyl ketone, vinyl ethyl ketone, vinyl isopropenyl ketone); and monomers having an olefin skeleton (e.g., ethylene, propylene, butadiene).

Polycondensation resins refer to resins produced by condensation reactions.

Examples of polycondensation resins include polyester resins, polyamide resins, polyacetal resins, polycarbonate resins, and polyurethane resins.

Polycondensation resins may be polyester resins.

Specific examples of polyester resins include polycondensation polymers of a polycarboxylic acid and a polyhydric alcohol.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Among these, the polycarboxylic acid may be, for example, an aliphatic dicarboxylic acid, an anhydride thereof, or a lower alkyl ester thereof, more preferably an aliphatic dicarboxylic acid, an anhydride thereof, or a lower alkyl ester thereof, and an aromatic dicarboxylic acid, an anhydride thereof, or a lower alkyl ester thereof.

The polycarboxylic acid may be a combination of a dicarboxylic acid and a trivalent or higher valent carboxylic acid having a crosslinked structure or branched structure. Examples of the trivalent or higher valent carboxylic acid include trimellitic acid, pyromellitic acid, anhydrides thereof, and lower (e.g., C1 to C5) alkyl esters thereof.

These polycarboxylic acids may be used alone or in combination of two or more.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Among these, the polyhydric alcohol may be, for example, an aliphatic diol or an alicyclic diol, more preferably an aliphatic diol.

The polyhydric alcohol may be a combination of a diol and a trihydric or higher polyhydric alcohol having a crosslinked structure or branched structure. Examples of the trihydric or higher polyhydric alcohol include glycerol, trimethylolpropane, and pentaerythritol.

These polyhydric alcohols may be used alone or in combination of two or more.

The volume-average particle diameter D50v of the resin base particles is preferably 1 μm or more and 40 μm or less, more preferably 3 μm or more and 20 μm or less, still more preferably 4 μm or more and 10 μm or less. This is because such a volume-average particle diameter has little effect on the charge amount of the silica particles and provides resin particles having good dispersibility in a hydrophobic material.

The volume-average particle diameter D50v of the resin base particles is measured by using Coulter Multisizer II (available from Beckman Coulter, Inc.) and an electrolyte ISOTON-II (available from Beckman Coulter, Inc.).

Before measurement, 0.5 mg or more and 50 mg or less of a test sample is added to 2 ml of a 5 mass % aqueous solution of a surfactant (e.g., sodium alkylbenzene sulfonate) serving as a dispersant. The resulting mixture is added to 100 ml or more and 150 ml or less of the electrolyte.

The electrolyte containing a suspension of the sample is subjected to a dispersion treatment using an ultrasonic disperser for 1 minute, and the particle diameter of each of particles having a particle diameter in the range of 2 μm or more and 60 μm or less is measured by using Coulter Multisizer II with an aperture having a diameter of 100 μm. The number of sampled particles is 50,000.

The volume-based cumulative distribution of the measured particle diameter is drawn from the smaller particle diameter, and the particle diameter at a cumulative percentage of 50% is defined as a volume-average particle diameter D50v.

The weight-average molecular weight of the resin base particles is preferably 5,000 or more and 100,000 or less, more preferably 10,000 or more and 60,000 or less, still more preferably 20,000 or more and 30,000 or less.

The weight-average molecular weight is defined as a value measured by gel permeation chromatography (GPC). The measurement of the molecular weight by GPC is carried out by using a GPC system HLC-8120GPC available from Tosoh Corporation, a column TSKgel SuperHM-M (15 cm) available from Tosoh Corporation, and a tetrahydrofuran (THF) solvent. The weight-average molecular weight and the number-average molecular weight are calculated from the molecular weight calibration curve created on the basis of the obtained measurement results using a monodisperse polystyrene standard.

The resin base particles may contain additives, such as ultraviolet absorbers and antioxidants according to intended use.

Silica Particles

The silica particles on the surfaces of the resin base particles will be described below in detail.

An example method for causing the silica particles to reside on the surfaces of the resin base particles involves mixing the silica particles and the resin base particles as described below.

Composition of Silica Particles

The silica particles contain a quaternary ammonium salt and have hydrophobized surfaces.

A method for hydrophobizing the surfaces of the silica particles will be described in a method for manufacturing the silica particles as described below.

Quaternary Ammonium Salt

The silica particles contain a quaternary ammonium salt. The quaternary ammonium salt may be used alone or in combination of two or more.

The quaternary ammonium salt is not limited and may be a known quaternary ammonium salt.

The quaternary ammonium salt may include a compound represented by general formula (AM) in order to further reduce the charge amount of the resin particles. The compound represented by general formula (AM) may be used alone or in combination of two or more.

In general formula (AM), $R^1$, $R^2$, $R^3$, and $R^4$ each independently represent an optionally substituted alkyl group, aralkyl group, or aryl group, and X represents an anion.

Examples of the alkyl group represented by $R^1$ to $R^4$ include C1-C20 linear alkyl groups and C3-C20 branched alkyl groups.

Examples of C1-C20 linear alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, and n-hexadecyl groups.

Examples of C3-C20 branched alkyl groups include isopropyl, isobutyl, sec-butyl, tert-butyl, isopentyl, neopentyl, tert-pentyl, isohexyl, sec-hexyl, tert-hexyl, isoheptyl, sec-heptyl, tert-heptyl, isooctyl, sec-octyl, tert-octyl, isononyl, sec-nonyl, tert-nonyl, isodecyl, sec-decyl, and tert-decyl groups.

Among the above groups, the alkyl group represented by $R^1$ to $R^4$ may be a C1-C15 alkyl group, such as methyl, ethyl, butyl, or tetradecyl group.

Examples of the aralkyl group represented by $R^1$ to $R^4$ include C7-C30 aralkyl groups.

Examples of C7-C30 aralkyl groups include benzyl, phenylethyl, phenylpropyl, 4-phenylbutyl, phenylpentyl, phenylhexyl, phenylheptyl, phenyloctyl, phenylnonyl, naphthylmethyl, naphthylethyl, anthrathylmethyl, and phenylcyclopentylmethyl groups.

Among the above groups, the aralkyl group represented by $R^1$ to $R^4$ may be a C7-C15 aralkyl group, such as benzyl, phenylethyl, phenylpropyl, or 4-phenylbutyl group.

Examples of the aryl group represented by $R^1$ to $R^4$ include C6-C20 aryl groups.

Examples of C6-C20 aryl groups include phenyl, pyridyl, and naphthyl groups.

Among the above groups, the aryl group represented by $R^1$ to $R^4$ may be a C6-C10 aryl group, such as phenyl group.

Examples of the anion represented by X include organic anions and inorganic anions.

Examples of organic anions include polyfluoroalkyl sulfonate ion, polyfluoroalkyl carboxylate ion, tetraphenylborate ion, aromatic carboxylate ion, and aromatic sulfonate ion (e.g., 1-naphthol-4-sulfonate ion).

Examples of inorganic anions include $MoO_4^{2-}$, $OH^-$, $F^-$, $Fe(CN)_6^{3-}$, $Cl^-$, $Br^-$, $NO_2^-$, $NO_3^-$, $CO_3^{2-}$, $PO_4^{3-}$, and $SO_4^{2-}$.

In general formula (AM), two or more of $R^1$, $R^2$, $R^3$, and $R^4$ are optionally bonded to each other to form a ring. Examples of the ring formed by bonding two or more of $R^1$, $R^2$, $R^3$, and $R^4$ to each other include C2-C20 alicyclic rings and C2-C20 heterocyclic amines.

The silica particles according to the exemplary embodiments are such that, in the compound represented by general formula (AM), $R^1$, $R^2$, $R^3$, and $R^4$ may each independently represent an optionally substituted C1-C16 alkyl group or C7-C10 aralkyl group in order to further reduce the charge amount of the resin particles.

Examples of the structure other than X in the compound represented by general formula (AM) are illustrated below, but the exemplary embodiments are not limited to these structures.

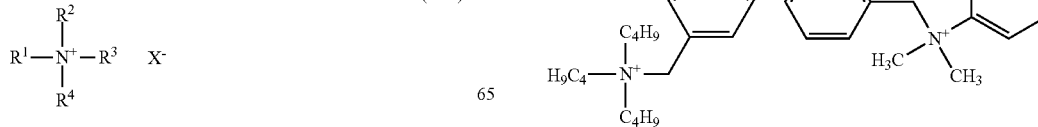

General Formula (AM)

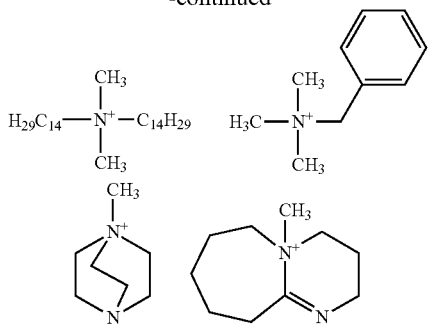

Aluminum Atoms

The silica particles may contain aluminum atoms.

In the silica particles containing aluminum atoms, the aluminum atoms tend to interact with the quaternary ammonium salt, and thus the quaternary ammonium salt tends to be more easily immobilized to the silica particles. For this reason, the quaternary ammonium salt is less likely to be released from the silica particles, and the charge amount of the silica particles is kept low more assuredly. The charge amount of the resin particles having the silica particles containing aluminum atoms is thus kept low more assuredly.

To keep the charge amount of the resin particles low, the aluminum atoms may be added to the silica particles by the surface treatment with an aluminum compound.

Examples of the aluminum compound include compounds having an aluminum atom bonded to an organic group with an oxygen atom therebetween.

The organic group (containing an oxygen atom) bonded to an aluminum atom with the oxygen atom therebetween in the aluminum compound is preferably at least one group selected from the group consisting of alkoxy groups, acyloxy groups, alkyl acetoacetate groups (anions of alkyl acetoacetate compounds), and acetyl acetonate groups (anions of acetylacetone compounds), more preferably at least one group selected from the group consisting of alkoxy groups and alkyl acetoacetate groups (anions of alkyl acetoacetate compounds).

Specific examples of the aluminum compounds having an aluminum atom bonded to an organic group with an oxygen atom therebetween include aluminum alkoxides, such as aluminum methoxide, aluminum ethoxide, aluminum n-propoxide, aluminum i-propoxide, aluminum n-butoxide, aluminum i-butoxide, aluminum sec-butoxide, and aluminum tert-butoxide; chelates, such as aluminum ethyl acetoacetate diisopropylate, aluminum tris(ethyl acetoacetate), aluminum bis(ethyl acetoacetate) mono(acetylacetonate), and aluminum tris(acetylacetonate); aluminum oxide acylates, such as aluminum oxide 2-ethylhexanoate and aluminum oxide laurate; complexes of aluminum and β-diketones, such as acetylacetonate; complexes of aluminum and β-keto esters, such as ethyl acetoacetate; and complexes of aluminum and carboxylic acids, such as acetic acid, butyric acid, lactic acid, and citric acid.

The aluminum compound may have one or more (e.g., two or more) alkoxy groups from the viewpoint of, for example, the control of the reaction rate, or the shape, particle diameter, and particle diameter distribution of the produced silica particles. In other words, the aluminum compound may be such that one or more (e.g., two or more) alkoxy groups (alkyl groups each bonded to an aluminum atom with one oxygen atom therebetween) are bonded to an aluminum atom. The number of carbon atoms in the alkoxy group is preferably 8 or less, more preferably 2 or more and 4 or less from the viewpoint of, for example, the control of the reaction rate, or the shape, particle diameter, and particle diameter distribution of the produced silica composite particles.

The aluminum compound may be at least one compound selected from the group consisting of aluminum ethyl acetoacetate diisopropylate, aluminum tris(ethyl acetoacetate), aluminum bis(ethyl acetoacetate) mono(acetylacetonate), and aluminum tris(acetylacetonate) from the viewpoint of hardness uniformity.

A method for surface-treating the silica particles with the aluminum compound will be described in a method for manufacturing the silica particles as described below. Proportion of Amount N of Nitrogen Element (N/Silica Particles×100)

In the silica particles, the proportion (N/silica particles×100) of the amount N of nitrogen element from the quaternary ammonium salt detected by oxygen-nitrogen analysis is preferably 0.01% or more, more preferably 0.02% or more and 1.00% or less, still more preferably 0.03% or more and 0.80% or less, in order to further reduce the charge amount of the resin particles.

Examples of a specific process for controlling the proportion (N/silica particles×100) in the above range include, but are not limited to, controlling the mixing ratio, time, and the like for mixing the quaternary ammonium salt and a suspension containing the silica particles in the manufacture of the silica particles.

The oxygen-nitrogen analysis is carried out using an oxygen-nitrogen analyzer (e.g., EMGA-920 available from HORIBA, Ltd.) for a cumulative time of 45 seconds to determine the proportion (N/entire particles×100) of the amount N of nitrogen element. If a nitrogen element-containing material, such as ammonia, is used as a catalyst in the particle manufacturing process, the proportion (N/entire particles×100) of the amount N of nitrogen element in the nitrogen element-containing material used in the manufacturing process is obtained from the calibration curve of a known material using a gas chromatography-mass spectrometer (e.g., GCMS-TQ8040NX available from Shimadzu Corporation), and the amount of nitrogen element from the quaternary ammonium salt is obtained by taking a difference. Ratio (Si/Al) of Amount Si of Silicon Element In the silica particles containing aluminum atoms, the ratio (Si/Al) of the amount Si of silicon element detected by X-ray photoelectron spectroscopy to the amount Al of aluminum element detected by X-ray photoelectron spectroscopy is preferably 0.01 or more and 0.30 or less, more preferably 0.03 or more and 0.2 or less, still more preferably 0.05 or more and 0.1 or less, in order to further reduce the charge amount of the resin particles.

Examples of a specific process for controlling the ratio (Si/Al) in the above range include, but are not limited to, controlling the mixing ratio, time, and the like for mixing the aluminum compound and a suspension containing untreated silica particles in the manufacture of the silica particles.
Properties of Silica Particles
Maximum Frequency in Pore Diameter Distribution Curve by Nitrogen Gas Adsorption Analysis To further reduce the charge amount of the resin particles, the ratio ($F_{BEFORE}/F_{AFTER}$) between the maximum frequencies of pore diameters of 2 nm or less in the silica particles is preferably 0.9 or more and 1.1 or less, more preferably 0.95 or more and 1.1 or less, still more preferably 0.97 or more and 1.15 or less.

To further reduce the charge amount of the resin particles, the ratio ($F_{SINTERING}/F_{BEFORE}$) between the maximum frequencies of pore diameters of 2 nm or less in the silica particles is preferably 5 or more and 20 or less, more preferably 5 or more and 15 or less, still more preferably 7 or more and 12 or less.

$F_{BEFORE}$: the maximum frequency of pore diameters of 2 nm or less in the silica particles before cleaning determined from a pore diameter distribution curve in nitrogen gas adsorption analysis.

$F_{AFTER}$: the maximum frequency of pore diameters of 2 nm or less in the silica particles after cleaning determined from a pore diameter distribution curve in nitrogen gas adsorption analysis.

$F_{SINTERING}$: the maximum frequency of pore diameters of 2 nm or less in the silica particles before cleaning and after sintering at 700° C. determined from a pore diameter distribution curve in nitrogen gas adsorption analysis.

Examples of a specific process for controlling the ratio ($F_{BEFORE}/F_{AFTER}$) between the frequencies before and after cleaning in the above range include, but are not limited to, the surface treatment of silica particles with a quaternary ammonium salt using a supercritical fluid in the manufacture of the silica particles.

Examples of a specific process for controlling the ratio ($F_{SINTERING}/F_{BEFORE}$) between the frequencies before and after sintering in the above range include, but are not limited to, the surface treatment of silica particles with a quaternary ammonium salt using a supercritical fluid in the manufacture of the silica particles.

The pore diameter distribution curve in nitrogen gas adsorption analysis is derived according to various calculation formulas from an adsorption isotherm obtained by measurement of the nitrogen gas adsorption amount. The silica particles, which serve as an adsorbent, are cooled to the liquid nitrogen temperature (−196° C.), nitrogen gas is introduced, and the nitrogen gas adsorption amount is obtained by a volumetric method or a gravimetric method. The pressure of nitrogen gas introduced is gradually increased, and the nitrogen gas adsorption amount is plotted against equilibrium pressure to create an adsorption isotherm. From the adsorption isotherm, the pore diameter distribution curve where the vertical axis represents frequency and the horizontal axis represents pore diameter is obtained according to a calculation formula of, for example, the MP method, the HK method, the SF method, or the CY method. From the obtained pore diameter distribution curve, the maximum frequency of pore diameters of 2 nm or less is obtained.

Method for Cleaning Silica Particles in Measurement of Maximum Frequency in Pore Diameter Distribution Curve by Nitrogen Gas Adsorption Analysis The silica particles are cleaned in the following manner.

A mixture is prepared by placing 1 g of the silica particles, 2.5 g of ethanol, and 2.5 g of ion exchange water in a 20-ml laboratory screw tube and mixing these materials using an ultrasonic cleaner (e.g., a desktop ultrasonic cleaner W-113 available from Honda Electronics Co. Ltd., oscillation frequency 45 Hz). The mixture is then centrifuged at 10000 rpm for 30 minutes in a centrifuge machine (e.g., FB-4000 available from Kurabo Industries Ltd.), and the supernatant is discarded, and the precipitated silica particles are then taken out. This process is repeated again, and the silica particles are dried. These silica particles are used as silica particles after cleaning.

Method for Sintering Silica Particles in Measurement of Maximum Frequency in Pore Diameter Distribution Curve by Nitrogen Gas Adsorption Analysis The silica particles are sintered in the following manner.

The silica particles (1 g) are placed in a 20-ml sintering crucible and sintered in a nitrogen atmosphere at 600° C. for 1 hour using a sintering machine (e.g., KM-100 available from Advantec Toyo Kaisha, Ltd.). The obtained sintered product is used as silica particles after sintering. Number-Average Particle Diameter D50p of Silica Particles To further reduce the charge amount of the resin particles, the number-average particle diameter D50p of the silica particles is preferably 5 nm or more and 200 nm or less, more preferably 5 nm or more and 100 nm or less, still more preferably 10 nm or more and 80 nm or less.

The number-average particle diameter D50p of the silica particles is determined in the following manner.

The silica particles are captured with a scanning electron microscope (SEM), and the equivalent circle diameter (nm) of each of 100 arbitrarily selected primary particles is determined by image analysis. The equivalent circle diameter at a cumulative percentage of 50% (50th particle) from the smaller particle diameter in the equivalent circle diameter distribution is defined as a number-average particle diameter D50p.

Average Pore Diameter of Silica Particles

To further reduce the charge amount of the resin particles, the average pore diameter of the silica particles is preferably 0.55 nm or more and 2.00 nm or less, more preferably 0.55 nm or more and 1.50 nm or less, still more preferably 0.55 nm or more and 1.00 nm or less.

The average pore diameter of the silica particles is derived according to various calculation formulas from an adsorption isotherm obtained by measurement of the nitrogen gas adsorption amount. The silica particles, which serve as an adsorbent, are cooled to the liquid nitrogen temperature (−196° C.), nitrogen gas is introduced, and the nitrogen gas adsorption amount is obtained by a volumetric method or a gravimetric method. The pressure of nitrogen gas introduced is gradually increased, and the nitrogen gas adsorption amount is plotted against equilibrium pressure to create an adsorption isotherm. From the adsorption isotherm, the average pore diameter is obtained according to a calculation formula of, for example, the MP method, the HK method, the SF method, or the CY method.

The measurement of nitrogen gas adsorption is carried out under liquid nitrogen (77.4 K) using ultra-high purity nitrogen gas in a high-precision gas adsorption measurement system (e.g., BELSORP MAX II available from Microtrac-BEL Corporation).

Examples of a specific process for controlling the average pore diameter of the silica particles in the above range include, but are not limited to, 1) controlling the liquid composition during particle production; 2) controlling the dropping rate during particle production; and 3) controlling the drying temperature.

Method for Manufacturing Silica Particles

A method for manufacturing silica particles includes, in sequence: a preparation step of preparing a suspension containing silica particles; a first surface treatment step of surface-treating the silica particles with a quaternary ammonium salt by mixing the suspension and the quaternary ammonium salt; and a second surface treatment step of surface-treating, with an organosilicon compound, the silica particles surface-treated with the quaternary ammonium salt.

The method for manufacturing silica particles includes the first surface treatment step. The first surface treatment step involves immobilizing the quaternary ammonium salt to the surfaces of the silica particles. Since the particle surfaces have a charge opposite to the charge of the silica surface because of the quaternary ammonium salt, the particle surfaces are unlikely to be triboelectrically charged, and it is easy to manufacture silica particles having a small charge amount.

The method for manufacturing silica particles includes the second surface treatment step. The second surface treatment step involves hydrophobizing the surfaces of the silica particles having surfaces treated with the quaternary ammonium salt. This step makes the silica particles compatible with a hydrophobic material. Thus, when the resin particles according to the exemplary embodiments having the silica particles on their surfaces are added to a hydrophobic material or the like, the resin particles show high dispersibility in the hydrophobic material.

The steps of the method for manufacturing silica particles will be described below in detail.

Preparation Step

The method for manufacturing silica particles includes the preparation step.

In the preparation step, a suspension containing the silica particles is prepared.

The preparation step includes, for example, a step (1-a) of preparing a silica particle suspension containing the silica particles.

The preparation step includes, as necessary, a step (1-b) of performing aluminum modification of the silica particles with an aluminum compound by mixing the silica particle suspension and the aluminum compound after the step (1-a).

Examples of the step (1-a) include a step (i) of preparing a silica particle suspension by mixing the silica particles and an alcohol-containing solvent; and a step (ii) of preparing a silica particle suspension by producing silica particles by a sol-gel method.

Examples of the silica particles used in the step (i) include sol-gel silica particles (silica particles produced by a sol-gel method), aqueous colloidal silica particles, alcohol-based silica particles, fumed silica particles produced by a gas-phase method, and fused silica particles.

The alcohol-containing solvent used in the step (i) may be a solvent containing only an alcohol or may be a mixed solvent of an alcohol and other solvent. Examples of the alcohol include lower alcohols, such as methanol, ethanol, n-propanol, isopropanol, and butanol. Examples of other solvent include water; ketones, such as acetone, methyl ethyl ketone, and methyl isobutyl ketone; cellosolves, such as methyl cellosolve, ethyl cellosolve, butyl cellosolve, and cellosolve acetate; and ethers, such as dioxane and tetrahydrofuran. In the case of mixed solvent, the proportion of alcohol is preferably 80 mass % or more, more preferably 90 mass % or more.

The step (1-a) may be a step of preparing a silica particle suspension by producing silica particles by a sol-gel method.

More specifically, the step (1-a) is, for example, a sol-gel method including: an alkali catalyst solution preparation step of preparing an alkali catalyst solution containing an alkali catalyst in an alcohol-containing solvent; and a silica particle generation step of generating silica particles by supplying a tetraalkoxysilane and an alkali catalyst into the alkali catalyst solution.

The alkali catalyst solution preparation step may involve preparing an alcohol-containing solvent and mixing the solvent and an alkali catalyst to form an alkali catalyst solution.

The alcohol-containing solvent may be a solvent containing only an alcohol or may be a mixed solvent of an alcohol and other solvent. Examples of the alcohol include lower alcohols, such as methanol, ethanol, n-propanol, isopropanol, and butanol. Examples of other solvent include water; ketones, such as acetone, methyl ethyl ketone, and methyl isobutyl ketone; cellosolves, such as methyl cellosolve, ethyl cellosolve, butyl cellosolve, and cellosolve acetate; and ethers, such as dioxane and tetrahydrofuran. In the case of mixed solvent, the proportion of alcohol is preferably 80 mass % or more, more preferably 90 mass % or more.

The alkali catalyst is used to accelerate the reactions (hydrolysis reaction and condensation reaction) of the tetraalkoxysilane. Examples of the alkali catalyst include basic catalysts, such as ammonia, urea, and monoamines. The alkali catalyst may be ammonia.

The concentration of the alkali catalyst in the alkali catalyst solution is preferably 0.5 mol/L or more and 1.0 mol/L or less, more preferably 0.6 mol/L or more and 0.8 mol/L or less, still more preferably 0.65 mol/L or more and 0.75 mol/L or less, in order to increase the particle diameter uniformity and circularity of the generated silica particles.

The silica particle generation step involves generating silica particles by supplying a tetraalkoxysilane and an alkali catalyst into an alkali catalyst solution to cause the reactions (hydrolysis reaction and condensation reaction) of the tetraalkoxysilane in the alkali catalyst solution.

In the silica particle generation step, nuclear particles are generated by the reactions of the tetraalkoxysilane at the beginning of supply of the tetraalkoxysilane (nuclear particle generation stage), and silica particles are then generated through the growth of the nuclear particles (nuclear particle growth stage).

Examples of the tetraalkoxysilane include tetramethoxysilane, tetraethoxysilane, tetrapropoxysilane, and tetrabutoxysilane. The tetraalkoxysilane may be tetramethoxysilane or tetraethoxysilane from the viewpoint of the control of the reaction rate and the uniformity of the shape of the generated silica particles.

Examples of the alkali catalyst supplied into the alkali catalyst solution include basic catalysts, such as ammonia, urea, monoamines, and quaternary ammonium salts. The alkali catalyst may be ammonia. The alkali catalyst supplied together with the tetraalkoxysilane may be the same as or different from the alkali catalyst contained in the alkali catalyst solution, but is preferably the same as the alkali catalyst contained in the alkali catalyst solution.

A method for supplying the tetraalkoxysilane and the alkali catalyst into the alkali catalyst solution may be a continuous supply method or an intermittent supply method.

In the silica particle generation step, the temperature (temperature during supply) of the alkali catalyst solution is preferably 5° C. or higher and 50° C. or lower, more preferably 15° C. or higher and 40° C. or lower.

The step (1-b) involves performing aluminum modification of the silica particles with the aluminum compound by mixing the silica particle suspension and the aluminum compound.

The step (1-b) allows a functional group (e.g., an organic group, such as alkoxy group) of the aluminum compound to react with silanol groups on the surfaces of the silica particles to generate silica particles having surfaces treated with the aluminum compound.

The step (1-b) is carried out by, for example, adding the aluminum compound to the silica particle suspension to cause reactions under stirring in a temperature range of, for example, 20° C. or higher and 80° C. or lower.

The aluminum compound may be a compound having an organic group bonded to an aluminum atom with an oxygen atom therebetween. Examples of the compound include aluminum alkoxides, such as aluminum methoxide, aluminum ethoxide, aluminum n-propoxide, aluminum i-propoxide, aluminum n-butoxide, aluminum i-butoxide, aluminum sec-butoxide, and aluminum tert-butoxide; chelates, such as aluminum ethyl acetoacetate diisopropylate, aluminum tris(ethyl acetoacetate), aluminum bis(ethyl acetoacetate) mono(acetylacetonate), and aluminum tris(acetylacetonate); aluminum oxide acylates, such as aluminum oxide 2-ethylhexanoate and aluminum oxide laurate; complexes of aluminum and β-diketones, such as acetylacetonate; complexes of aluminum and β-keto esters, such as ethyl acetoacetate; complexes of aluminum and amines, such as triethanolamine; and complexes of aluminum and carboxylic acids, such as acetic acid, butyric acid, lactic acid, and citric acid.

The aluminum compound may have one or more (e.g., two or more) alkoxy groups from the viewpoint of, for example, the control of the reaction rate, or the shape, particle diameter, and particle diameter distribution of the generated aluminum-bonded silica particles. In other words, the aluminum compound may be such that one or more (e.g., two or more) alkoxy groups (alkyl groups each bonded to an aluminum atom with one oxygen atom therebetween) are bonded to an aluminum atom. The number of carbon atoms in the alkoxy group is preferably 8 or less, more preferably 2 or more and 4 or less from the viewpoint of, for example, the control of the reaction rate, or the shape, particle diameter, and particle diameter distribution of the generated aluminum-bonded silica particles.

Specific examples of the aluminum compound include chelates, such as aluminum ethyl acetoacetate diisopropylate, aluminum tris(ethyl acetoacetate), aluminum bis(ethyl acetoacetate) mono(acetylacetonate), and aluminum tris(acetylacetonate).

The step (1-b) may be carried out by mixing the silica particle suspension and an alcohol liquid containing the aluminum compound in an alcohol. Thus, the method for manufacturing the silica particles may further include a step of preparing an alcohol liquid containing the aluminum compound in an alcohol, and this step may be carried out in advance.

Examples of the alcohol include lower alcohols, such as methanol, ethanol, n-propanol, isopropanol, and butanol.

When the aluminum compound has an alkoxy group, the alcohol may have a smaller number of carbon atoms than the alkoxy group of the aluminum compound (specifically, for example, a difference in number of carbon atoms is 2 or more and 4 or less) from the viewpoint of, for example, the control of the reaction rate, or the shape, particle diameter, and particle diameter distribution of the generated aluminum-bonded silica particles.

The alcohol may be the same as or different from the alcohol contained in the silica particle suspension, but is preferably the same as the alcohol contained in the silica particle suspension.

The concentration of the aluminum compound in the alcohol liquid containing the aluminum compound in an alcohol is preferably 0.05 mass % or more and 10 mass % or less, more preferably 0.1 mass % or more and 5 mass % or less.

From the viewpoint of, for example, the control of the reaction rate, or the shape, particle diameter, and particle diameter distribution of the generated aluminum-bonded silica particles, the lower limit of the total amount of the aluminum compound relative to the solid content of the silica particle suspension is preferably 0.001 mass % or more, more preferably 0.01 mass % or more, still more preferably 0.1 mass % or more, and the upper limit is preferably 10 mass % or less, more preferably 5 mass % or less, still more preferably 3 mass % or less.

The conditions of the surface treatment of the silica particles with the aluminum compound are not limited. The surface treatment is carried out by, for example, allowing the aluminum compound to react with the silica particles under stirring in a temperature range of, for example, 5° C. or higher and 50° C. or lower.

First Surface Treatment Step

The method for manufacturing silica particles includes the first surface treatment step.

In the first surface treatment step, a powder of the silica particles having surfaces treated with a quaternary ammonium salt is prepared by mixing the suspension and the quaternary ammonium salt.

The use of a supercritical fluid in the first surface treatment step facilitates permeation of the quaternary ammonium salt into the pores of the silica particles and produces silica particles from which the quaternary ammonium salt is less likely to be released even by cleaning.

The use of spray drying also produces silica particles from which the quaternary ammonium salt is less likely to be released even by cleaning.

Examples of the quaternary ammonium salt are the same as the examples of the quaternary ammonium salt contained in the silica particles described above.

The total amount of the quaternary ammonium salt relative to the solid content of the suspension containing the silica particles is preferably 0.5 mass % or more, more preferably 1.5 mass % or more and 10 mass % or less, still more preferably 2 mass % or more and 5 mass % or less.

The conditions of the surface treatment of the silica particles with the quaternary ammonium salt are not limited. The surface treatment is carried out by, for example, allowing the quaternary ammonium salt to react with the silica particles under stirring in a temperature range of, for example, 20° C. or higher and 50° C. or lower.

The first surface treatment step may be carried out by, for example, mixing the silica particle suspension and the alcohol liquid containing the quaternary ammonium salt in an alcohol. The first surface treatment step may be conducted by circulation of a supercritical fluid. Thus, the method for manufacturing the silica particles may further include a step of preparing an alcohol liquid containing the quaternary ammonium salt in an alcohol, and this step may be carried out in advance.

The alcohol may be the same as or different from the alcohol contained in the silica particle suspension, but is preferably the same as the alcohol contained in the silica particle suspension.

The concentration of the quaternary ammonium salt in the alcohol liquid containing the quaternary ammonium salt in an alcohol is preferably 0.05 mass % or more and 10 mass % or less, more preferably 0.1 mass % or more and 6 mass % or less.

Examples of substances used as a supercritical fluid include carbon dioxide, water, methanol, ethanol, and acetone. The first surface treatment step may use supercritical carbon dioxide in order to improve the efficiency of the treatment and suppress generation of coarse particles.

Specifically, the first surface treatment step is carried out, for example, in accordance with the following procedure.

The suspension containing the silica particles and the quaternary ammonium salt are placed in a sealed reactor and mixed. Next, liquid carbon dioxide is introduced into the sealed reactor. The sealed reactor is then heated and pressurized with a high-pressure pump to bring carbon dioxide in the sealed reactor into the supercritical state. Liquid carbon dioxide is then introduced into the sealed reactor so that supercritical carbon dioxide flows out from the sealed reactor, whereby supercritical carbon dioxide is circulated in the suspension in the sealed reactor. While supercritical carbon dioxide circulates in the suspension, the solvent is dissolved in supercritical carbon dioxide, and the solvent is removed together with supercritical carbon dioxide flowing out from the sealed reactor.

The temperature and pressure in the sealed reactor are those at which carbon dioxide becomes supercritical. Since the critical point of carbon dioxide is 31.1° C./7.38 MPa, the temperature and pressure are, for example, 40° C. or higher and 200° C. or lower/10 MPa or more and 30 MPa or less.

The flow rate of the supercritical fluid in the first surface treatment step may be 80 mL/sec or higher and 240 mL/sec or lower.

Second Surface Treatment Step

The method for manufacturing silica particles further includes the second surface treatment step after the first surface treatment step.

In the second surface treatment step, the silica particles having surfaces treated with the quaternary ammonium salt is surface-treated with an organosilicon compound.

The second surface treatment step tends to allow a functional group of the organosilicon compound to react with OH groups on the surfaces of the silica particles to generate, for example, silica particles having atomic groups of —Si—O—Si—R (R is an organic group) on the surfaces.

The second surface treatment step may use a wet treatment or a supercritical treatment.

The second surface treatment step may use a supercritical treatment in order to provide resin particles having good dispersibility in a hydrophobic material.

The second surface treatment step can provide silica particles having hydrophobized surfaces.

Specifically, the second surface treatment step using a wet treatment is carried out, for example, in accordance with the following procedure. The surface treatment is conducted by, after the first surface treatment step, heating the silica particle suspension to 60° C. under stirring with a stirrer and adding an organosilicon compound. The stirring time is preferably 10 minutes or more and 24 hours or less, more preferably 20 minutes or more and 120 minutes or less, still more preferably 20 minutes or more and 90 minutes or less.

Specifically, the second surface treatment step using a supercritical treatment is carried out, for example, in accordance with the following procedure.

The use of a supercritical fluid improves the efficiency of the reaction between the organosilicon compound and the surfaces of the silica particles and results in a high-grade surface treatment.

Examples of substances used as a supercritical fluid include carbon dioxide, water, methanol, ethanol, and acetone. The second surface treatment step may use supercritical carbon dioxide in order to improve the efficiency of the treatment and suppress generation of coarse particles.

In a sealed reactor equipped with a stirrer, the powder, that is, the silica particles having surfaces treated with the quaternary ammonium salt, and the organosilicon compound are placed. Next, liquid carbon dioxide is introduced into the sealed reactor. The sealed reactor is then heated and pressurized with a high-pressure pump to bring carbon dioxide in the sealed reactor into the supercritical state. The stirrer is then driven to stir the reaction system.

The temperature and pressure in the sealed reactor are those at which carbon dioxide becomes supercritical. Since the critical point of carbon dioxide is 31.1° C./7.38 MPa, the temperature and pressure are, for example, 40° C. or higher and 200° C. or lower/10 MPa or more and 30 MPa or less. The stirring time is preferably 10 minutes or more and 24 hours or less, more preferably 20 minutes or more and 120 minutes or less, still more preferably 20 minutes or more and 90 minutes or less.

Examples of the organosilicon compound include silane compounds having a lower alkyl group, such as methyltrimethoxysilane, dimethyldimethoxysilane, trimethylchlorosilane, and trimethylmethoxysilane; silane compounds having a vinyl group, such as vinyltrimethoxysilane and vinyltriethoxysilane; silane compounds having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane; silane compounds having a styryl group, such as p-styryltrimethoxysilane and p-styryltriethoxysilane; silane compounds having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, and N-phenyl-3-aminopropyltrimethoxysilane; silane compounds having an isocyanate alkyl group, such as 3-isocyanatopropyltrimethoxysilane and 3-isocyanatopropyltriethoxysilane; and silazane compounds, such as hexamethyldisilazane and tetramethyldisilazane.

Solvent Removal Step

The method for manufacturing silica particles may further include a solvent removal step as necessary.

The solvent removal step involves drying the suspension containing the silica particles having surfaces treated with the quaternary ammonium salt to remove the solvent and provide a powder. Examples of dying methods include heat drying, spray drying, and supercritical drying.

In heat drying and spray drying, surface tension tends to work between the particles at the end of drying, and coarse particles are thus easily generated through particle aggregation. However, the surface treatment with an organosilicon compound can suppress generation of coarse particles.

Spray drying can be performed by a conventionally known method using a commercial spray dryer (e.g., rotary disc-type or nozzle-type). For example, a spray liquid is sprayed at a rate of 0.2 L/h or more and 1 L/h or less into the hot gas stream. In this process, the inlet temperature of the hot gas is preferably in the range of 70° C. or higher and 400° C. or lower, and the outlet temperature of the hot air is preferably in the range of 40° C. or higher and 120° C. or lower. At an inlet temperature of lower than 70° C., the solid content of the dispersion is not dried well. At an inlet temperature of higher than 400° C., the particles deform during spray drying. At an outlet temperature of lower than 40° C., the solid content adheres to the inside of the apparatus because poor dryness of the solid content. The inlet temperature is more preferably in the range of 100° C. or higher and 300° C. or lower.

The concentration of the silica particles in the silica particle suspension during spray drying may be in the range of 10% by weight or more and 30% by weight or less in terms of solid content.

In supercritical drying, the solvent is removed with a supercritical fluid, so that surface tension is unlikely to work between the particles, and the primary particles contained in the suspension are dried with aggregation of the primary particles suppressed. It is thus easy to provide silica particles having high uniformity in particle diameter and having surfaces treated with the quaternary ammonium salt.

Examples of substances used as a supercritical fluid include carbon dioxide, water, methanol, ethanol, and acetone. The solvent removal step may use supercritical carbon dioxide in order to improve the efficiency of the treatment and suppress generation of coarse particles.

Specifically, the solvent removal step is carried out, for example, in accordance with the following procedure.

The suspension is placed in a sealed reactor, and liquid carbon dioxide is next introduced into the sealed reactor. The sealed reactor is then heated and pressurized with a high-pressure pump to bring carbon dioxide in the sealed reactor into the supercritical state. Liquid carbon dioxide is then introduced into the sealed reactor so that supercritical carbon dioxide flows out from the sealed reactor, whereby supercritical carbon dioxide is circulated in the suspension in the sealed reactor. While supercritical carbon dioxide circulates in the suspension, the solvent is dissolved in supercritical carbon dioxide, and the solvent is removed together with supercritical carbon dioxide flowing out from the sealed reactor.

The temperature and pressure in the sealed reactor are those at which carbon dioxide becomes supercritical. Since the critical point of carbon dioxide is 31.1° C./7.38 MPa, the temperature and pressure are, for example, 40° C. or higher and 200° C. or lower/10 MPa or more and 30 MPa or less.

The flow rate of the supercritical fluid in the solvent removal step may be 80 mL/sec or higher and 240 mL/sec or lower.

The obtained silica particles may be disintegrated and sifted as necessary to remove coarse particles and aggregates. Disintegration is performed by using, for example, a dry grinding machine, such a jet mill, a vibration mill, a ball mill, or a pin mill. Sifting is performed by using, for example, a vibration sifter or a wind sifting machine.

Properties of Resin Particles
Pyrolysis Mass Spectrometry of Resin Particles

For the resin particles according to the exemplary embodiments, a difference (detection temperature A−detection temperature B) between the detection temperature A and the detection temperature B is more than 50° C., where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning.

At a difference (detection temperature A−detection temperature B) between the detection temperature A and the detection temperature B of more than 50° C., the quaternary ammonium salt is less likely to be released from the silica particles. At a difference (detection temperature A−detection temperature B) between the detection temperature A and the detection temperature B of more than 50° C., the charge amount of the resin particles is kept low.

To keep the charge amount of the resin particles low, the difference (detection temperature A−detection temperature B) between the detection temperature A and the detection temperature B is preferably more than 50° C. and 250° C. or less, more preferably more than 50° C. and 200° C. or less, still more preferably 60° C. or more and 175° C. or less, yet still more preferably 75° C. or more and 150° C. or less, most preferably 75° C. or more and 120° C. or less.

To keep the charge amount of the resin particles low, the detection temperature A is preferably 200° C. or higher and 700° C. or lower, more preferably 300° C. or higher and 500° C. or lower, still more preferably 300° C. or higher and 400° C. or lower, most preferably 300° C. or higher and 350° C. or lower.

To keep the charge amount of the resin particles low, the detection temperature B is preferably 150° C. or higher and 600° C. or lower, more preferably 200° C. or higher and 400° C. or lower, still more preferably 200° C. or higher and 350° C. or lower, most preferably 200° C. or higher and 300° C. or lower.

The "pyrolysis product of the quaternary ammonium salt" as used herein refers to a volatile component generated as gas by decomposition of the quaternary ammonium salt contained in the silica particles of the resin particles when the resin particles are heated in a pyrolyzer described below. Examples of the pyrolysis product of the quaternary ammonium salt include a tertiary amine generated by elimination of one of four substituents bonded to the nitrogen atom of the quaternary ammonium salt; a secondary amine generated by elimination of two of four substituents bonded to the nitrogen atom of the quaternary ammonium salt; and a primary amine generated by elimination of three of four substituents bonded to the nitrogen atom of the quaternary ammonium salt.

The "detection temperature from a pyrolysis product of the quaternary ammonium salt" refers to a temperature corresponding to a peak top of the peak from a pyrolysis product of the quaternary ammonium salt in a EGA thermogram obtained by using the pyrolyzer described below.

The method for measuring the detection temperature A and the detection temperature B will be described below.

The detection temperature A and the detection temperature B are measured by using GCMS-QP2020 NX available from Shimadzu Corporation.

Ten milligrams of the resin particles are weighed and placed in a pyrolyzer. Pyrolysis mass spectrometry is carried out using the pyrolyzer and a gas chromatography-mass spectrometer under the following conditions to obtain an EGA thermogram and an MS spectrum of a pyrolysis product generated from the resin particles. Subsequently, components included in peaks of the obtained EGA thermogram are identified from the measurement result of the MS spectrum. The peak from the pyrolysis product of the quaternary ammonium salt is identified among the peaks of the EGA thermogram, and the temperature corresponding to the top of the peak is defined as a detection temperature A.

The detection temperature B is measured by the same procedure as that for the detection temperature A except that 10 mg of the resin particles after cleaning described below are weighed and placed in the pyrolyzer.

A method for identifying the peak from the pyrolysis product of the quaternary ammonium salt among the peaks of the EGA thermogram is as described below.

MS spectra acquired by gas chromatography-mass spectrometry are checked for the components corresponding to the respective peaks of the EGA thermogram. The MS spectrum in which fragment ions generated from the pyrolysis product of the quaternary ammonium salt are detected is specified. In the EGA thermogram, the peak corresponding to the MS spectrum in which fragment ions generated from the pyrolysis product of the quaternary ammonium salt are detected is specified as the peak from the pyrolysis product of the quaternary ammonium salt.

The detection temperature A and the detection temperature B may be measured by using the silica particles alone. In the measurement using the silica particles alone, the detection temperature A and the detection temperature B are measured by the same procedure as that described above except that the amount of the silica particles placed in the pyrolyzer is 0.5 mg.

The cleaning described below is performed by the same procedure except that 0.5 mg of the silica particles are added instead of the resin particles.

If the silica particles already contain the same compound as the pyrolysis product of the quaternary ammonium salt, the pyrolysis mass spectrometry described above is conducted after pre-cleaning of the silica particles in the following step in the measurement of the detection temperature A and the detection temperature B using the silica particles alone.

Pre-Cleaning

A mixture is prepared by placing 1 g of the silica particles and 5.0 g of ethanol, which is a cleaning liquid, in a 20-ml laboratory screw tube and mixing these materials using an ultrasonic cleaner (e.g., a desktop ultrasonic cleaner W-113 available from Honda Electronics Co. Ltd., oscillation frequency 45 Hz). The mixture is then centrifuged at 10000 rpm for 30 minutes in a centrifuge machine (e.g., FB-4000 available from Kurabo Industries Ltd.), and the supernatant is discarded, and the precipitated silica particles are then taken out. This process is repeated again, and the silica particles are dried.

If the silica particles already contain the same compound (e.g., trialkylamine) as the pyrolysis product of the quaternary ammonium salt, the same compound as the pyrolysis product of the quaternary ammonium salt is identified by high-performance liquid chromatography (HPLC) analysis of the cleaning liquid after ultrasonic cleaning in the pre-cleaning.

Ratio of Electrostatic Capacitance

To further reduce the charge amount of the resin particles, the ratio ($C_{AFTER}/C_{BEFORE}$) between the electrostatic capacitances of the resin particles is preferably 1.5 or less, more preferably 1.3 or less, still more preferably 1.1 or less.

$C_{BEFORE}$: the electrostatic capacitance of the resin particles before cleaning separated from a mixture formed by mixing the resin particles before cleaning and glass particles under particular conditions.

$C_{AFTER}$: the electrostatic capacitance of the resin particles after cleaning separated from a mixture formed by mixing the resin particles after cleaning and glass particles under particular conditions.

Examples of a specific process for controlling the ratio ($C_{BEFORE}/C_{AFTER}$) between the electrostatic capacitances before and after cleaning in the above range include, but are not limited to, the surface treatment of silica particles with a quaternary ammonium salt using a supercritical fluid in the manufacture of the silica particles.

The glass particles are not limited but are of SPL series available from Unitika Ltd.

The particular conditions refer to the following conditions.

Mass ratio: resin particles/glass particles=1/10
Mixing temperature: room temperature (10° C.)
Mixer: Henschel Mixer (e.g., FM mixer available from Nippon Coke & Engineering Co., Ltd.)
Mixing time: 5 minutes
Mixing speed: 49 rpm The electrostatic capacitance is measured in the following manner.

Two grams of a sample after mixing with Turbula shaker/mixer described above is placed in a metal container covered with a 20-μm mesh stainless steel wire cloth, and the electrostatic capacitance is measured by using a charge amount measuring device (e.g., TB-200 available from Toshiba Chemical Corporation).

Method for Cleaning Resin Particles in Measurement of Detection Temperature B and Measurement of Electrostatic Capacitance The resin particles are cleaned in the following manner.

A mixture is prepared by placing 2 g of the resin particles, 10 g of ethanol, and 10 g of ion exchange water in a 50-ml laboratory screw tube and mixing these materials using an ultrasonic cleaner (e.g., a desktop ultrasonic cleaner W-113 available from Honda Electronics Co. Ltd., oscillation frequency 45 Hz). The mixture is then centrifuged at 10000 rpm for 30 minutes in a centrifuge machine (e.g., FB-4000 available from Kurabo Industries Ltd.), and the supernatant is discarded, and the precipitated resin particles are then taken out. This process is repeated again, and the resin particles are dried. These resin particles are used as resin particles after cleaning.

Ratio of Particle Diameter

The ratio (number-average particle diameter D50p of silica particles/volume-average particle diameter D50v of resin base particles) of the number-average particle diameter D50p of the silica particles to the volume-average particle diameter D50v of the resin base particles is preferably 0.002 or more and 0.05 or less, more preferably 0.004 or more and 0.02 or less, still more preferably 0.008 or more and 0.015 or less.

Method for Manufacturing Resin Particles

The resin particles according to the exemplary embodiments are produced by attaching the silica particles to the surfaces of the resin base particles.

An example method for attaching the silica particles to the surfaces of the resin base particles may involve placing and mixing the silica particles and the resin base particles in, for example, a V-type blender, a Henschel mixer, or a Loedige mixer. The silica particles may be attached to the surfaces of the resin base particles in multiple stages.

The resin particles according to the exemplary embodiments may be such that the silica particles are attached to the surfaces of the resin base particles at a calculated coverage in the range of 5% or more and 80% or less, as described above.

To control the amount of the attached silica particles in the above range, 0.1 mass % or more and 10 mass % or less of the silica particles relative to the total mass of the resin base particles are placed in, for example, a V-type blender, a Henschel mixer, or a Loedige mixer.

EXAMPLES

Examples will be described below, but the present disclosure is not limited to these Examples. In the following description, the units "part" and "%" are on a mass basis, unless otherwise specified.

Manufacture of Silica Particles
Silica Particles S1 to S9
Preparation Step

A suspension containing silica particles is prepared as described below.

Preparation of Alkali Catalyst Solution

To a glass reaction container equipped with a metal stir bar, a dropping nozzle, and a thermometer, methanol, ion exchange water, and 10% ammonia water ($NH_4OH$) are added in the amounts shown in Table 1 and mixed by stirring to provide an alkali catalyst solution.

Production of Silica Particles by Sol-Gel Method

The temperature of the alkali catalyst solution is controlled at 25° C., and the alkali catalyst solution is purged with nitrogen. Next, with the alkali catalyst solution stirred, the amount of tetramethoxysilane (TMOS) shown in Table 1 and 176 parts by mass of ammonia water ($NH_4OH$) having a catalyst ($NH_3$) concentration of 4.4% are added dropwise at the same time to provide a silica particle suspension.

Preparation of Alcohol Liquid Containing Quaternary Ammonium Salt

An alcohol liquid is prepared by diluting a type of quaternary ammonium salt shown in Table 1 with butanol.

First Surface Treatment Step

The temperature of the silica particle suspension is controlled at 25° C., and the alcohol liquid controlled at 25° C. is added. In this case, the alcohol liquid is added such that the number of parts by mass of the quaternary ammonium salt relative to 100 parts by mass of the solid content of the silica particle suspension is as shown in Table 1. Next, the resulting suspension is stirred at 30° C. for 30 minutes to provide a suspension containing silica particles containing the quaternary ammonium salt.

Subsequently, 300 parts by mass of the suspension containing the silica particles containing the quaternary ammonium salt is placed in a reaction vessel. With the suspension stirred, $CO_2$ is introduced, and the temperature and the pressure in the reaction vessel are increased to 120° C. and 20 MPa. While the suspension is stirred with the temperature and the pressure maintained, $CO_2$ is allowed to flow in and out at a flow rate of 5 L/min. The solvent is then removed over 120 minutes to provide a powder.

Second Surface Treatment Step

To 100 parts by mass of the powder remaining in the reaction vessel, 100 parts by mass of 1,1,1,3,3,3-hexamethyldisilazane (HMDS) is added. With the materials stirred, the reaction vessel is filled with $CO_2$, and the temperature and the pressure in the reaction vessel are increased to 150° C. and 15 MPa. The materials are continuously stirred for 30 minutes with the temperature and pressure maintained. Next, the pressure is released to atmospheric pressure, and the temperature is cooled to room temperature (25° C.). The stirrer is then stopped, and silica particles being a powder is provided.

Silica Particles CS1

Silica particles are manufactured by the same process as that for the silica particles S1 except that the second surface treatment step is not carried out.

Silica Particles S10

Preparation Step

Preparation of Alkali Catalyst Solution

To a glass reaction container equipped with a metal stir bar, a dropping nozzle, and a thermometer, methanol, ion exchange water, and 10% ammonia water ($NH_4OH$) are added in the amounts shown in Table 1 and mixed by stirring to provide an alkali catalyst solution.

Production of Silica Particles by Sol-Gel Method

The temperature of the alkali catalyst solution is controlled at 45° C., and the alkali catalyst solution is purged with nitrogen. Next, with the alkali catalyst solution stirred, the amount of tetramethoxysilane (TMOS) shown in Table 1 and 186 parts by mass of ammonia water ($NH_4OH$) having a catalyst ($NH_3$) concentration of 4.4% are added dropwise at the same time to manufacture a silica particle suspension.

Preparation of Alcohol Liquid Containing Quaternary Ammonium Salt

An alcohol liquid is prepared by diluting a type of quaternary ammonium salt shown in Table 1 with butanol.

Quaternary Ammonium Salt Treatment and Surface Treatment (First and Second Surface Treatment Steps)

The temperature of the silica particle suspension is controlled at 25° C., and the alcohol liquid controlled at 25° C. is added. In this case, the alcohol liquid is added such that the number of parts by mass of the quaternary ammonium salt relative to 100 parts by mass of the solid content of the silica particle suspension is as shown in Table 1. Next, the resulting suspension is stirred at 30° C. for 30 minutes to provide a suspension containing silica particles containing the quaternary ammonium salt.

Next, the temperature of the suspension is controlled at 55° C., and 100 parts by mass of 1,1,1,3,3,3-hexamethyldisilazane (HMDS) is added relative to 100 parts by mass of the powder. With the materials stirred, the surface treatment is carried out for 1 hour to provide a silica particle suspension.

Solvent Removal Step

The solvent in the suspension of the silica particles is removed by using a mini spray dryer B-290 (available from Nihon BUCHI K.K.). The input temperature in the cylinder is set to 200° C., and the silica particle suspension is fed at a feed rate of 0.2 L/hour, whereby the solvent is removed by spray drying to provide dried silica particles.

Silica Particles CS2

Silica particles are manufactured by the same process as that for the silica particles S1 except that the first surface treatment step does not involve surface treatment with a quaternary ammonium salt, that is, involves the following process.

In a reaction vessel, 300 parts by mass of the suspension of the silica particles is placed. With the suspension stirred, $CO_2$ is introduced, and the temperature and the pressure in the reaction vessel are increased to 120° C. and 20 MPa. While the suspension is stirred with the temperature and the pressure maintained, $CO_2$ is allowed to flow in and out at a flow rate of 5 L/min. The solvent is then removed over 120 minutes to provide a powder.

Silica Particles CS3

Silica Particles are manufactured in accordance with the manufacturing method described in Example 1 in Japanese Unexamined Patent Application Publication No. 2017-39618.

TABLE 1

| Silica Particles type | Temperature of Alkali Catalyst Solution ° C. | Methanol amount (parts) | Ion Exchange Water amount (parts) | Ammonia Water amount (parts) | TMOS amount (parts) | Quaternary Ammonium Salt type | Quaternary Ammonium Salt amount (parts) |
|---|---|---|---|---|---|---|---|
| S1 | 25 | 320 | 64.8 | 7.2 | 50 | TMBAC | 4 |
| S2 | 25 | 320 | 64.8 | 7.2 | 50 | P-51 | 4 |
| S3 | 25 | 320 | 64.8 | 7.2 | 50 | TP-415 | 4 |
| S4 | 25 | 320 | 64.8 | 7.2 | 50 | dimethyl distearyl ammonium chloride | 4 |
| S5 | 25 | 320 | 64.8 | 7.2 | 250 | P-51 | 4 |
| S6 | 25 | 320 | 129.6 | 14.4 | 500 | P-51 | 4 |
| S7 | 25 | 300 | 70 | 7.2 | 50 | P-51 | 4 |
| S8 | 25 | 320 | 64.8 | 7.2 | 50 | P-51 | 14 |
| S9 | 25 | 320 | 64.8 | 7.2 | 50 | P-51 | 0.15 |
| S10 | 45 | 320 | 19 | 1.0 | 150 | TP415 | 4 |
| CS1 | 25 | 320 | 64.8 | 7.2 | 50 | P-51 | 4 |
| CS2 | 25 | 320 | 64.8 | 7.2 | 50 | — | 0 |
| CS3 | 25 | 320 | 64.8 | 7.2 | 50 | P-51 | 4 |

Silica Particles SA11 to SA20
Preparation Step

First, a suspension containing the silica particles containing aluminum atoms in Example is prepared as described below.

To a glass reaction container equipped with a metal stir bar, a dropping nozzle, and a thermometer, methanol, ion exchange water, and 10% ammonia water ($NH_4OH$) are added in the amounts shown in Table 2 and mixed by stirring to provide an alkali catalyst solution.

The temperature of the alkali catalyst solution is controlled at 25° C., and the alkali catalyst solution is purged with nitrogen. Next, with the alkali catalyst solution stirred, the amount of tetramethoxysilane (TMOS) shown in Table 2 and 176 parts by mass of ammonia water ($NH_4OH$) having a catalyst ($NH_3$) concentration of 4.4% are added dropwise at the same time to provide a silica particle suspension.

An alcohol liquid is prepared by diluting an aluminum compound (aluminum ethyl acetoacetate diisopropylate available from Wako Pure Chemical Industries, Ltd.) with butanol such that the concentration of the aluminum compound is 50%.

The temperature of the silica particle suspension is controlled at 25° C., and the alcohol liquid controlled at 25° C. is added. In this case, the alcohol liquid is added such that 1 part by mass of the aluminum compound is added relative to 100 parts by mass of the solid content of the silica particle suspension. Next, the surface treatment is carried out by stirring the resulting mixture for 30 minutes so that the aluminum compound reacts with the surfaces of the silica particles to provide a suspension of silica particles containing aluminum atoms.

First Surface Treatment Step

An alcohol liquid is prepared by diluting a type and concentration of quaternary ammonium salt shown in Table 2 with methanol.

The temperature of the suspension of silica particles containing aluminum atoms is controlled at 25° C., and the alcohol liquid controlled at 25° C. is added. In this case, the alcohol liquid is added such that the concentration of the quaternary ammonium salt relative to 100 parts by mass of the solid content of the aluminum-bonded silica particle suspension is as shown in Table 2. Next, the surface treatment is carried out by stirring the resulting mixture at 30° C. for 30 minutes so that the quaternary ammonium salt reacts with the surfaces of the aluminum-bonded silica particles to provide a suspension containing silica particles containing the quaternary ammonium salt and aluminum atoms.

Second Surface Treatment Step

To the suspension containing the silica particles containing the quaternary ammonium salt and aluminum atoms, 30 parts by mass of 1,1,1,3,3,3-hexamethyldisilazane (HMDS) is added. With the materials stirred, a reaction vessel is filled with $CO_2$, and the temperature and the pressure in the reaction vessel are increased to 150° C. and 15 MPa. While the suspension is stirred for 30 minutes with the temperature and the pressure maintained, $CO_2$ is allowed to flow in and out at a flow rate of 5 L/min. The solvent is removed over 120 minutes to provide silica particles being a powder and containing the quaternary ammonium salt and aluminum atoms in Example.

Silica Particles CSA4

Silica composite particles are manufactured by the same process as that for the silica particles S11 except that the second surface treatment step is not carried out. Silica Particles CSA5

Silica composite particles are manufactured by the same process as that for the silica particles S11 except that the first surface treatment step is not carried out. Silica Particles CSA6

In the preparation step, the production of silica particles by a sol-gel method is as described below. Furthermore, silica composite particles are manufactured by the same process as that for the silica particles S11 except that the first surface treatment step is not carried out.

The temperature of the alkali catalyst solution is controlled at 25° C., and the alkali catalyst solution is purged with nitrogen. Next, with the alkali catalyst solution stirred, the amount of tetramethoxysilane (TMOS) shown in Table 2, an alcohol liquid containing the amount of a quaternary ammonium salt shown in Table 2, and 176 parts by mass of ammonia water ($NH_4OH$) having a catalyst ($NH_3$) concentration of 4.4% are added dropwise at the same time to provide a silica particle suspension.

TABLE 2

| Silica Particles type | Methanol amount (parts) | Ion Exchange Water amount (parts) | 10% Ammonia amount (parts) | TMOS amount (parts) | Aluminum Compound type | Aluminum Compound amount (parts) | Quaternary Ammonium Salt type | Quaternary Ammonium Salt amount (parts) |
|---|---|---|---|---|---|---|---|---|
| SA11 | 320 | 64.8 | 7.2 | 50 | ALCH | 0.5 | TMBAC | 4 |
| SA12 | 320 | 64.8 | 7.2 | 50 | ALCH | 0.5 | P-51 | 4 |
| SA13 | 320 | 64.8 | 7.2 | 50 | ALCH | 0.5 | TP-415 | 4 |
| SA14 | 320 | 64.8 | 7.2 | 50 | ALCH | 0.5 | dimethyl distearyl ammonium chloride | 4 |
| SA15 | 320 | 64.8 | 7.2 | 260 | ALCH | 0.5 | P-51 | 4 |
| SA16 | 320 | 129.6 | 14.5 | 520 | ALCH | 0.5 | P-51 | 4 |
| SA17 | 300 | 70 | 7.2 | 50 | ALCH | 0.5 | P-51 | 4 |
| SA18 | 320 | 64.8 | 7.2 | 50 | ALCH | 0.05 | P-51 | 4 |
| SA19 | 320 | 64.8 | 7.2 | 50 | ALCH | 0.5 | P-51 | 15 |
| SA20 | 320 | 64.8 | 7.2 | 50 | ALCH | 0.5 | P-51 | 0.15 |
| CSA4 | 320 | 64.8 | 7.2 | 50 | ALCH | 0.5 | P-51 | 4 |
| CSA5 | 320 | 64.8 | 7.2 | 50 | ALCH | 0.5 | — | 0 |
| CSA6 | 320 | 64.8 | 7.2 | 50 | — | — | TP-415 | 4 |

The abbreviations in Tables represent the following compounds.

TMBAC: benzyltributylammonium chloride
TP-415: N,N-Dimethyl-N-tetradecyl-1-tetradecanaminium, hexa-μ-oxotetra-μ3-oxodi-μ5-oxotetradecaoxooctamolybdate(4-) (4:1)
P-51: benzyltrimethylammonium chloride
ALCH: aluminum ethyl acetoacetate diisopropylate Manufacture of Resin Base Particles In a reaction container equipped with a stirrer, a thermometer, a condenser, and a nitrogen gas inlet tube, 23 mol % of dimethyl terephthalate, 10 mol % of isophthalic acid, 15 mol % of dodecenylsuccinic anhydride, 3 mol % of trimellitic anhydride, 5 mol % of ethylene oxide 2-mol adduct of bisphenol A, and 45 mol % of propylene oxide 2-mol adduct of bisphenol A are placed. The mixture in the reaction container is purged with dry nitrogen gas, and 0.06 mol % of dibutyltin oxide is then added as a catalyst. The mixture is allowed to react under nitrogen gas flow at about 190° C. for about 7 hours and further allowed to react under stirring at a higher temperature of about 250° C. for about 5.0 hours. The pressure in the reaction container is then reduced to 10.0 mmHg, and the mixture is allowed to react under stirring at a reduced pressure for about 0.5 hours to provide a polyester resin.

Next, 100 parts of polyester resin is melt-kneaded in a Banbury mixer-type kneader. The kneaded material is molded into a plate having a thickness of about 1 cm by using a rolling roll, roughly ground into about several millimeters in a Fitz mill grinder, and finely ground in an IDS-type grinder. The resulting particles are then further classified by an elbow-type classifier to provide resin base particles A having a volume-average particle diameter D50v of 7 μm.

Examples 1 to 20 and Comparative Examples 1 to 6

A combination of 100 parts of resin base particles and 2.0 parts of silica particles described in Table 3 is mixed in a Henschel Mixer (available from Mitsui Miike Machinery Co., Ltd.) at 1,300 rpm for 3 minutes to provide resin particles.

Evaluation

Evaluation of Charging Characteristics

The electrostatic capacitance of the resin particles produced in Examples is measured by the same procedure as that in the measurement of the electrostatic capacitance ($C_{BEFORE}$) of the resin particles before cleaning separated from a mixture formed by mixing the resin particles before cleaning and glass particles under particular conditions, as described above in the ratio between the electrostatic capacitances.

The charging characteristics are evaluated in accordance with the following evaluation criteria on the basis of the obtained electrostatic capacitance ($C_{BEFORE}$).

G1: $C_{BEFORE}$ is 35 μF or less, and an increase in electrostatic capacitance is strongly suppressed.
G2: $C_{BEFORE}$ is more than 35 μF and 48 μF or less, and an increase in electrostatic capacitance is suppressed.
G3: $C_{BEFORE}$ is more than 48 μF and 60 μF or less, and the electrostatic capacitance is slightly high.
G4: $C_{BEFORE}$ is more than 60 μF, and the electrostatic capacitance is high.

Evaluation of Frictional Resistance

In a Banbury mixer-type kneader, 55 parts of the resin particles produced in Example and 100 parts of styrene-butadiene rubber are melt-kneaded. The kneaded material is molded into a plate having a thickness of about 1 cm by using a rolling roll and used as a sample for evaluating frictional resistance. The obtained sample for evaluating frictional resistance is subjected to friction wear testing using a Tribogear variable normal load friction and wear measurement system HHS-2000 (available from Shinto Scientific Co., Ltd.), and the frictional force (gf) at the first reciprocation is measured. The frictional force (gf) is measured at total 5 different points of the same sample for evaluating frictional resistance, and the arithmetic average and standard deviation of the obtained frictional forces are calculated. The arithmetic average ratio ($gf_{ave}$) and the standard deviation ratio ($gf_{sta}$) are calculated in accordance with the following calculation formulas using the arithmetic average and the standard deviation.

Arithmetic Average Ratio($gf_{ave}$)=arithmetic average of Comparative Example 2/arithmetic average of Example×100

Comparative Example 2/arithmetic average of Example×100 Standard Deviation Ratio($gf_{sta}$)
=standard deviation of Comparative Example 2/standard deviation of Example×100

The frictional resistance is evaluated in accordance with the following criteria on the basis of the obtained arithmetic average ratio ($gf_{ave}$) 1 and standard deviation ratio ($gf_{sta}$).

As the arithmetic average ratio ($gf_{ave}$) of the frictional resistance (gf) increases, the frictional resistance suppression effect of the resin particles increases.

As the standard deviation ratio ($gf_{ave}$) of the frictional resistance (gf) increases, the resin particles show higher dispersibility in rubber.

Evaluation Criteria Based on Arithmetic Average Ratio ($gf_{ave}$)

G1: the arithmetic average ratio ($gf_{ave}$) is more than 106, and an increase in frictional resistance is strongly suppressed.
G2: the arithmetic average ratio ($gf_{ave}$) is more than 100 and 106 or less, and an increase in frictional resistance is suppressed.
G3: the arithmetic average ratio ($gf_{ave}$) is more than 97 and 100 or less, and the frictional resistance is slightly high.
G4: the arithmetic average ratio ($gf_{ave}$) is 97 or less, and the frictional resistance is high.

Evaluation Criteria Based on Standard Deviation Ratio ($gf_{sta}$)

G1: the standard deviation ratio ($gf_{sta}$) is more than 105, and the resin particles show very good dispersibility in rubber.
G2: the standard deviation ratio ($gf_{sta}$) is more than 100 and 105 or less, and the resin particles show good dispersibility in rubber.
G3: the standard deviation ratio ($gf_{sta}$) is more than 95 and 100 or less, and the resin particles show slightly poor dispersibility in rubber.
G4: the standard deviation ratio ($gf_{sta}$) is 95 or less, and the resin particles show poor dispersibility in rubber.

TABLE 3

| | Resin Base Particles | | Silica Particles | | | | | | |
|---|---|---|---|---|---|---|---|---|---|
| | type | volume-average particle diameter (μm) | type | $F_{BEFORE}/F_{AFTER}$ | $F_{SINTERING}/F_{BEFORE}$ | number-average particle diameter (nm) | average pore diameter (nm) | N/silica particles ×100 | Si/Al |
| Example 1 | A | 7 | S1 | 1.0 | 10.5 | 70 | 0.6 | 0.152 | — |
| Example 2 | A | 7 | S2 | 1.05 | 10.2 | 70 | 0.61 | 0.280 | — |
| Example 3 | A | 7 | S3 | 0.99 | 10.5 | 70 | 0.58 | 0.031 | — |
| Example 4 | A | 7 | S4 | 0.92 | 11.2 | 70 | 0.57 | 0.090 | — |
| Example 5 | A | 7 | S5 | 1.01 | 17.8 | 120 | 1.5 | 0.300 | — |
| Example 6 | A | 7 | S6 | 1.02 | 19.2 | 300 | 1.9 | 0.310 | — |
| Example 7 | A | 7 | S7 | 1.03 | 16.2 | 70 | 0.51 | 0.291 | — |
| Example 8 | A | 7 | S8 | 0.98 | 17.5 | 70 | 0.58 | 1.050 | — |
| Example 9 | A | 7 | S9 | 1 | 6.2 | 70 | 0.61 | 0.009 | — |
| Example 10 | A | 7 | S10 | 1.1 | 19.5 | 50 | 0.9 | 0.300 | — |
| Example 11 | A | 7 | SA11 | 1.0 | 10.5 | 70 | 0.6 | 0.152 | 0.05 |
| Example 12 | A | 7 | SA12 | 1.05 | 10.2 | 70 | 0.61 | 0.280 | 0.07 |
| Example 13 | A | 7 | SA13 | 0.99 | 10.5 | 70 | 0.58 | 0.031 | 0.09 |
| Example 14 | A | 7 | SA14 | 0.95 | 11.2 | 70 | 0.57 | 0.090 | 0.025 |
| Example 15 | A | 7 | SA15 | 1.02 | 17.8 | 125 | 1.5 | 0.300 | 0.03 |
| Example 16 | A | 7 | SA16 | 1.03 | 19.2 | 310 | 1.9 | 0.310 | 0.15 |
| Example 17 | A | 7 | SA17 | 1.01 | 16.2 | 70 | 0.51 | 0.291 | 0.2 |
| Example 18 | A | 7 | SA18 | 1.08 | 15 | 70 | 0.9 | 0.004 | 0.007 |
| Example 19 | A | 7 | SA19 | 0.98 | 17.5 | 70 | 0.58 | 1.050 | 0.1 |
| Example 20 | A | 7 | SA20 | 1 | 6.2 | 70 | 0.61 | 0.009 | 0.23 |
| Comparative Example 1 | A | 7 | CS1 | 1.03 | 8.1 | 70 | 0.66 | 0.248 | — |
| Comparative Example 2 | A | 7 | CS2 | 1.06 | 1.02 | 70 | 0.62 | 0.000 | — |
| Comparative Example 3 | A | 7 | CS3 | 1.25 | 2.15 | 85 | 0.71 | 0.450 | — |
| Comparative Example 4 | A | 7 | CSA4 | 1.03 | 8.1 | 70 | 0.66 | 0.248 | 0.08 |
| Comparative Example 5 | A | 7 | CSA5 | 1.06 | 1.02 | 70 | 0.62 | 0.000 | 0.06 |
| Comparative Example 6 | A | 7 | CSA6 | 1.25 | 2.15 | 85 | 0.71 | 0.450 | — |

| | Resin Particles | | | | charge amount | Evaluation frictional resistance | |
|---|---|---|---|---|---|---|---|
| | detection temperature (° C.) | | | | | | |
| | A | B | A−B | $C_{AFTER}/C_{BEFORE}$ | ($C_{BEFORE}$) | ($gf_{ave}$) | ($gf_{sta}$) |
| Example 1 | 300 | 200 | 100 | 1.15 | G1 | G1 | G1 |
| Example 2 | 350 | 250 | 100 | 1.1 | G1 | G1 | G1 |
| Example 3 | 400 | 300 | 100 | 1.05 | G1 | G1 | G1 |
| Example 4 | 400 | 300 | 100 | 1.08 | G1 | G1 | G1 |
| Example 5 | 370 | 250 | 120 | 1.16 | G1 | G1 | G1 |
| Example 6 | 400 | 250 | 150 | 1.23 | G1 | G1 | G1 |
| Example 7 | 330 | 250 | 80 | 1.31 | G1 | G1 | G1 |
| Example 8 | 310 | 250 | 60 | 1.41 | G1 | G1 | G1 |
| Example 9 | 400 | 250 | 150 | 1.02 | G2 | G1 | G1 |
| Example 10 | 400 | 300 | 100 | 1.4 | G1 | G1 | G1 |

TABLE 3-continued

| | | | | | | | |
|---|---|---|---|---|---|---|---|
| Example 11 | 320 | 200 | 120 | 1.15 | G1 | G1 | G1 |
| Example 12 | 370 | 250 | 120 | 1.1 | G1 | G1 | G1 |
| Example 13 | 420 | 300 | 120 | 1.05 | G1 | G1 | G1 |
| Example 14 | 420 | 300 | 120 | 1.08 | G1 | G1 | G1 |
| Example 15 | 390 | 250 | 140 | 1.16 | G1 | G1 | G1 |
| Example 16 | 420 | 220 | 200 | 1.23 | G1 | G1 | G1 |
| Example 17 | 350 | 250 | 100 | 1.31 | G1 | G1 | G1 |
| Example 18 | 340 | 250 | 90 | 1.25 | G1 | G1 | G1 |
| Example 19 | 420 | 250 | 170 | 1.41 | G1 | G1 | G1 |
| Example 20 | 420 | 300 | 120 | 1.02 | G2 | G1 | G1 |
| Comparative Example 1 | 300 | 260 | 40 | 1.01 | G2 | G4 | G4 |
| Comparative Example 2 | not detected | not detected | not detected | 1.05 | G4 | G3 | G3 |
| Comparative Example 3 | 300 | 260 | 40 | 1.98 | G4 | G2 | G2 |
| Comparative Example 4 | 310 | 290 | 20 | 1.01 | G2 | G4 | G4 |
| Comparative Example 5 | not detected | not detected | not detected | 1.05 | G3 | G3 | G3 |
| Comparative Example 6 | 410 | 380 | 30 | 1.98 | G2 | G4 | G4 |

The above results indicate that the resin particles according to Examples have a small charge amount and show good dispersibility in a hydrophobic material.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. Resin particles comprising:
   resin base particles; and
   silica particles on surfaces of the resin base particles, the silica particles containing a quaternary ammonium salt and having hydrophobized surfaces,
   wherein a difference (detection temperature A–detection temperature B) between a detection temperature A and a detection temperature B is more than 50° C., where the detection temperature A is a detection temperature from a pyrolysis product of the quaternary ammonium salt determined by pyrolysis mass spectrometry of the resin particles before cleaning, and the detection temperature B is a detection temperature from the pyrolysis product of the quaternary ammonium salt determined by pyrolysis mass spectrometry of the resin particles after cleaning.

2. Resin particles comprising:
   resin base particles; and
   silica particles on surfaces of the resin base particles, the silica particles containing a quaternary ammonium salt and having hydrophobized surfaces,
   wherein a ratio ($F_{BEFORE}/F_{AFTER}$) between maximum frequencies of pore diameters of 2 nm or less in the silica particles is 0.9 or more and 1.1 or less, and a ratio ($F_{SINTERING}/F_{BEFORE}$) between maximum frequencies of pore diameters of 2 nm or less in the silica particles is 5 or more and 20 or less, $F_{BEFORE}$: a maximum frequency of pore diameters of 2 nm or less in the silica particles before cleaning determined from a pore diameter distribution curve in nitrogen gas adsorption analysis, $F_{AFTER}$: a maximum frequency of pore diameters of 2 nm or less in the silica particles after cleaning determined from a pore diameter distribution curve in nitrogen gas adsorption analysis, and $F_{SINTERING}$: a maximum frequency of pore diameters of 2 nm or less in the silica particles before cleaning and after sintering at 700° C. determined from a pore diameter distribution curve in nitrogen gas adsorption analysis.

3. The resin particles according to claim 1, wherein the quaternary ammonium salt includes a compound represented by general formula (AM) below:

general formula (AM)

where $R^1$, $R^2$, $R^3$, and $R^4$ each independently represent an optionally substituted alkyl group, aralkyl group, or aryl group, and X represents an anion, and where two or more of $R^1$, $R^2$, $R^3$, and $R^4$ are optionally bonded to each other to form a ring.

4. The resin particles according to claim 2, wherein the quaternary ammonium salt includes a compound represented by general formula (AM) below:

general formula (AM)

where $R^1$, $R^2$, $R^3$, and $R^4$ each independently represent an optionally substituted alkyl group, aralkyl group, or aryl group, and X represents an anion, and where two or more of $R^1$, $R^2$, $R^3$, and $R^4$ are optionally bonded to each other to form a ring.

5. The resin particles according to claim 1, wherein the silica particles have a number-average particle diameter D50p of 5 nm or more and 200 nm or less.

6. The resin particles according to claim 2, wherein the silica particles have a number-average particle diameter D50p of 5 nm or more and 200 nm or less.

7. The resin particles according to claim 3, wherein the silica particles have a number-average particle diameter D50p of 5 nm or more and 200 nm or less.

8. The resin particles according to claim 4, wherein the silica particles have a number-average particle diameter D50p of 5 nm or more and 200 nm or less.

9. The resin particles according to claim 5, wherein the silica particles have a number-average particle diameter D50p of 5 nm or more and 100 nm or less.

10. The resin particles according to claim 6, wherein the silica particles have a number-average particle diameter D50p of 5 nm or more and 100 nm or less.

11. The resin particles according to claim 1, wherein a proportion (N/silica particles×100) of an amount N of nitrogen element in the silica particles detected by oxygen-nitrogen analysis is 0.01 or more and 1.0 or less.

12. The resin particles according to claim 1, wherein the silica particles have an average pore diameter of 0.55 nm or more and 2.00 nm or less.

13. The resin particles according to claim 1, wherein a ratio ($C_{AFTER}/C_{BEFORE}$) between electrostatic capacitances of the resin particles is 1.5 or less, $C_{BEFORE}$: an electrostatic capacitance of the resin particles before cleaning separated from a mixture formed by mixing the resin particles before cleaning and glass particles under particular conditions, and $C_{AFTER}$: an electrostatic capacitance of the resin particles after cleaning separated from a mixture formed by mixing the resin particles after cleaning and glass particles under particular conditions, wherein the particular conditions include a mass ratio of resin particles/glass particles of 1/10 and a mixer used for mixing is a Henschel Mixer at a mixing time of 5 minutes at a mixing temperature of 10° C. and a mixing speed of 49 rpm.

14. The resin particles according to claim 1, wherein the silica particles further contain aluminum atoms.

15. The resin particles according to claim 14, wherein the silica particles containing aluminum atoms are silica particles having surfaces treated with an aluminum compound.

16. The resin particles according to claim 14, wherein, in the silica particles containing aluminum atoms, a ratio (Si/Al) of an amount Si of silicon element detected by X-ray photoelectron spectroscopy to an amount Al of aluminum element detected by X-ray photoelectron spectroscopy is 0.01 or more and 0.30 or less.

17. The resin particles according to claim 1, wherein the resin base particles have a volume-average particle diameter D50v of 1 μm or more and 40 μm or less.

18. The resin particles according to claim 1, wherein the resin base particles contain at least one of vinyl resins and polycondensation resins.

19. The resin particles according to claim 1, wherein the difference (detection temperature A–detection temperature B) between the detection temperature A and the detection temperature B is 60° C. or more and 120° C. or less.

* * * * *